(12) United States Patent
Lee

(10) Patent No.: US 11,180,075 B1
(45) Date of Patent: Nov. 23, 2021

(54) HIDDEN LIGHT DEVICE FOR VEHICLE

(71) Applicants: Hyundai Motor Company, Seoul (KR); Kia Motors Corporation, Seoul (KR)

(72) Inventor: Soon Il Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/083,421

(22) Filed: Oct. 29, 2020

(30) Foreign Application Priority Data

May 19, 2020 (KR) .......................... 10-2020-0059838

(51) Int. Cl.
*B60Q 1/26* (2006.01)
*F21S 41/30* (2018.01)
*F21S 41/20* (2018.01)
*F21V 23/00* (2015.01)

(52) U.S. Cl.
CPC ............ *B60Q 1/2661* (2013.01); *F21S 41/20* (2018.01); *F21S 41/30* (2018.01); *F21V 23/003* (2013.01)

(58) Field of Classification Search
CPC ........ B60Q 1/2661; F21S 41/30; F21S 41/20; F21V 23/003
See application file for complete search history.

(56) References Cited

U.S. PATENT DOCUMENTS

| | | |
|---|---|---|
| 6,367,949 B1 | 4/2002 | Pederson |
| 6,488,394 B1 | 12/2002 | Mabe et al. |
| 10,059,256 B1 * | 8/2018 | Diedrich ................. B60R 19/52 |
| 10,214,140 B2 | 2/2019 | Belcher et al. |
| 10,627,092 B2 | 4/2020 | Brown et al. |
| 10,793,094 B2 | 10/2020 | Salter et al. |
| 10,920,950 B1 | 2/2021 | Glickman et al. |
| 2008/0049436 A1 | 2/2008 | Yoshihara et al. |
| 2010/0232174 A1 | 9/2010 | Arakawa et al. |
| 2011/0317442 A1 | 12/2011 | Makiuchi et al. |
| 2021/0148535 A1 | 5/2021 | Kim et al. |

FOREIGN PATENT DOCUMENTS

| | | |
|---|---|---|
| JP | 2020059445 A | 4/2020 |
| KR | 2017-0062405 A | 6/2017 |
| KR | 20210061753 A | 5/2021 |

OTHER PUBLICATIONS

Hyundai Motor Company (Dec. 31, 2019) "Two Faces of Grandeur, Day and Night of The New Grandeur", 24 pages.

* cited by examiner

*Primary Examiner* — Anne M Hines
(74) *Attorney, Agent, or Firm* — Mintz Levin Cohn Ferris Glovsky and Popeo, P.C.; Peter F. Corless

(57) ABSTRACT

A hidden light device for a vehicle is configured to emit light from a grill of the vehicle, and when the light is not emitted, aesthetics of the grill may be maintained. The hidden light device includes: the grill having an outer surface forming a pattern composed of a plurality of grids; grid panels provided to some or all of the plurality of grids, respectively; an optical module provided inside each of the grid panels to allow the grid panels to form the pattern of the grill when turned off, and to emit light through the grid panel when turned on so as to make the grid panel serve as lighting of the vehicle; and a controller configured to control the optical modules to be turned on and off independently.

8 Claims, 11 Drawing Sheets

FIG. 7

| POINT | TARGET VALUE(MIN) | TARGET VALUE(MAX) | MEASUREMENT VALUE(cd) | |
|---|---|---|---|---|
| 10U-5L | 80 | 1200 | 140.457 | |
| 10U-V | 80 | 1200 | 152.033 | |
| 10U-5R | 80 | 1200 | 142.964 | |
| 5U-20L | 40 | 1200 | 94.053 | |
| 5U-10L | 80 | 1200 | 230.495 | |
| 5U-V | 280 | 1200 | 311.403 | |
| 5U-10R | 80 | 1200 | 218.267 | |
| 5U-20R | 40 | 1200 | 81.162 | |
| H-20L | 100 | 1200 | 122.707 | |
| H-10L | 280 | 1200 | 315.988 | |
| H-5L | 360 | 1200 | 402.399 | |
| HV | 400 | 1200 | 424.918 | |
| H-5R | 360 | 1200 | 380.490 | |
| H-10R | 280 | 1200 | 288.476 | |
| H-20R | 100 | 1200 | 98.373 | DISSATISFACTION |
| 5D-20L | 40 | 1200 | 89.793 | |
| 5D-10L | 80 | 1200 | 220.000 | |
| 5D-V | 280 | 1200 | 294.080 | |
| 5D-10R | 80 | 1200 | 208.281 | |
| 5D-20R | 40 | 1200 | 84.301 | |

FIG. 8

| POINT | TARGET VALUE(MIN) | TARGET VALUE(MAX) | MEASUREMENT VALUE(cd) |
|---|---|---|---|
| 10U-5L | 80 | 1200 | 160.083 |
| 10U-V | 80 | 1200 | 172.719 |
| 10U-5R | 80 | 1200 | 163.548 |
| 5U-20L | 40 | 1200 | 107.992 |
| 5U-10L | 80 | 1200 | 264.631 |
| 5U-V | 280 | 1200 | 358.990 |
| 5U-10R | 80 | 1200 | 249.958 |
| 5U-20R | 40 | 1200 | 89.019 |
| H-20L | 100 | 1200 | 141.680 |
| H-10L | 280 | 1200 | 352.264 |
| H-5L | 360 | 1200 | 434.395 |
| HV | 400 | 1200 | 455.692 |
| H-5R | 360 | 1200 | 407.494 |
| H-10R | 280 | 1200 | 308.040 |
| H-20R | 100 | 1200 | 107.126 |
| 5D-20L | 40 | 1200 | 103.682 |
| 5D-10L | 80 | 1200 | 251.283 |
| 5D-V | 280 | 1200 | 335.145 |
| 5D-10R | 80 | 1200 | 235.794 |
| 5D-20R | 40 | 1200 | 92.412 |

FIG. 9

| POINT | TARGET VALUE(MIN) | TARGET VALUE(MAX) | MEASUREMENT VALUE(cd) |
|---|---|---|---|
| 10U-5L | 80 | 1200 | 138.912 |
| 10U-V | 80 | 1200 | 149.206 |
| 10U-5R | 80 | 1200 | 141.611 |
| 5U-20L | 40 | 1200 | 90.043 |
| 5U-10L | 80 | 1200 | 224.159 |
| 5U-V | 280 | 1200 | 320.598 |
| 5U-10R | 80 | 1200 | 237.150 |
| 5U-20R | 40 | 1200 | 93.441 |
| H-20L | 100 | 1200 | 114.927 |
| H-10L | 280 | 1200 | 302.209 |
| H-5L | 360 | 1200 | 391.853 |
| HV | 400 | 1200 | 433.726 |
| H-5R | 360 | 1200 | 406.943 |
| H-10R | 280 | 1200 | 318.099 |
| H-20R | 100 | 1200 | 122.523 |
| 5D-20L | 40 | 1200 | 105.034 |
| 5D-10L | 80 | 1200 | 247.944 |
| 5D-V | 280 | 1200 | 338.486 |
| 5D-10R | 80 | 1200 | 252.940 |
| 5D-20R | 40 | 1200 | 99.637 |

HIDDEN LIGHT DEVICE FOR VEHICLE

CROSS REFERENCE TO RELATED APPLICATION

The present application claims under 35 U.S.C. § 119(a) the benefit of Korean Patent Application No. 10-2020-0059838, filed May 19, 2020, the entire contents of which are incorporated by reference herein.

BACKGROUND

(a) Technical Field

The present disclosure relates to a hidden light device in which light is emitted from a grill of a vehicle.

(b) Description of the Related Art

In general, a vehicle is provided with one or more lamps (exterior lights) for the purpose of enabling a driver to see objects easier in a driving direction during night driving and for informing other vehicles or pedestrians about a driving state of the vehicle. For example, every vehicle is provided with headlights (i.e., each of which is also referred to as a headlamp), which function to illuminate the road ahead of the vehicle.

A lamp mounted on a vehicle may be classified into a headlamp, a fog light, a turn indicator light (i.e., turn signal), a brake light, and a backup light, and a direction of emitting light to the road surface is set differently depending on the type of exterior light.

Such a lamp typically can be used to identify objects by emitting light from a light bulb arranged in a forward direction, but recently, a light guide may be provided to improve exterior design, so that the light emitted having a certain image.

However, as a vehicle has limited space for accommodating a lamp such as the headlamp and the rear lamp, and information exchange by using the lamp is not available, there are limitations from the perspective of utility and design of conventional lamps.

The above descriptions as background arts are only for improving the understanding of the background of the present disclosure, and should not be accepted as acknowledging that they correspond to the related arts already known to those skilled in the art.

SUMMARY

The present disclosure provides a hidden light device in which a design of a grill of a vehicle is maintained by realizing the aesthetics of the grill when the light is turned off.

According to the present disclosure for achieving the above objective, a hidden light device for a vehicle includes: a grill having an outer surface forming a pattern composed of a plurality of grids; grid panels provided to some or all of the plurality of grids, respectively, each of the grid panels being coupled to an associated grid in a same shape as that of the associated grid to form a surface of the associated grid; an optical module provided inside each of the grid panels to allow the grid panels to form the pattern of the grill when turned off and to emit light through the grid panel when turned on so as to serve as lighting of the vehicle; and a controller configured to control the optical modules to be turned on and off independently, so as to allow an image of the lighting for a message delivery to be implemented through the grill as the light is emitted from some grid panels through selective operation of turning on and off of the optical modules.

The controller may be configured to control sequential lighting that sequentially turns on and off the plurality of optical modules, or may be configured to control an implementation of the image that communicates by turning on and off only some of the optical modules.

The grill may be composed of the grid panels having a same pattern shape, and the optical modules may be respectively provided inside some of the plurality of grid panels or all of the plurality of grid panels.

Each of the grid panels may be composed of a plurality of light emitting areas formed in a grid-shape.

The grill and the light emitting areas corresponding to the optical module may be in a rhombus shape.

The light of the optical module may be emitted to outside through a perforated hole provided in the light emitting area.

An entire area of the perforated hole may be configured to exceed at least half or more of an entire area of the light emitting area.

The perforated hole may be positioned on an upper side of the light emitting area, and a non-perforated part through which no light is transmitted may be provided on a lower side of the light emitting area.

The optical module may include: a light source for emitting the light; a reflector for reflecting the light from the light source; and a lens providing the light emitting area in which the light reflected through the reflector is emitted to outside and formed to be identical to the pattern shape of the grill.

The hidden light device having a structure as described above is configured to emit light from the grill of the vehicle, and when the light is not emitted, the aesthetics of the grill may be realized on the illuminated area, thereby maintaining the design of the grill.

BRIEF DESCRIPTION OF THE DRAWINGS

FIGS. 7 to 9 are tables showing the result of a light distribution efficiency experiment when an area of a perforated hole is less than 50% of an entire area of a light emitting area, when an area of the perforated hole is 60% or more of the entire area of the light emitting area, and when the area of the perforated hole is 60% or more in a state positioned at an upper side of the light emitting area, respectively.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a hidden light device according to a preferred exemplary embodiment of the present disclosure will be described with reference to the accompanying drawings.

Figure 1:
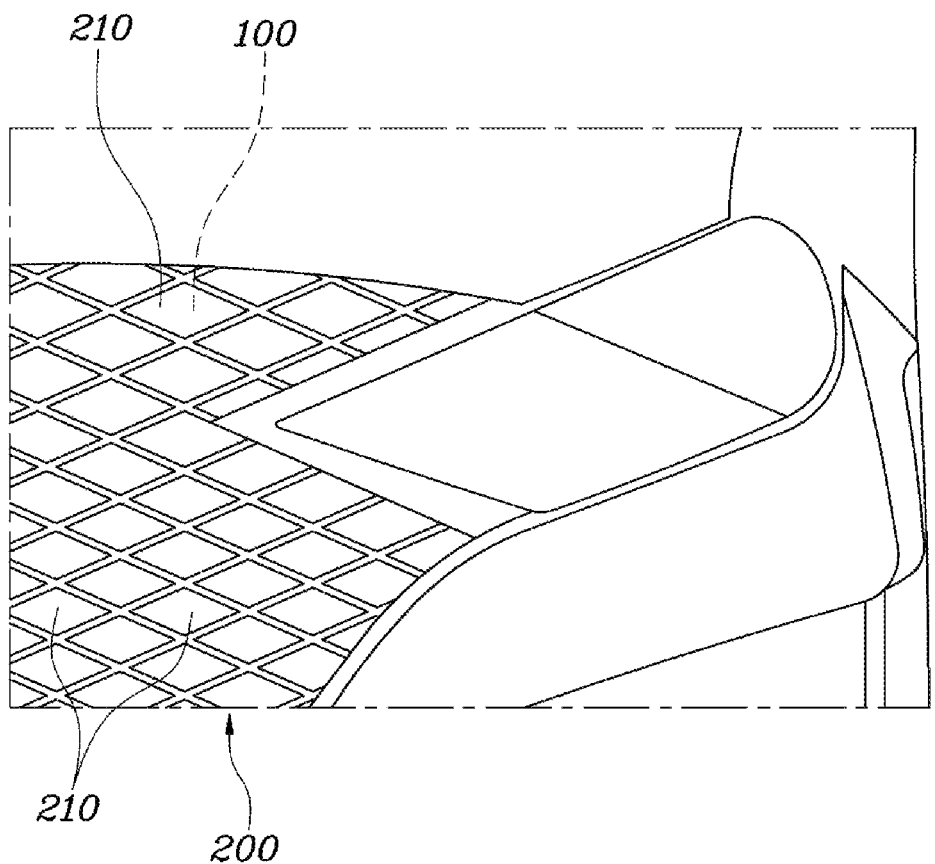
FIG. 1 is a view showing a hidden light device according to an exemplary embodiment of the present disclosure.
Figure 10:
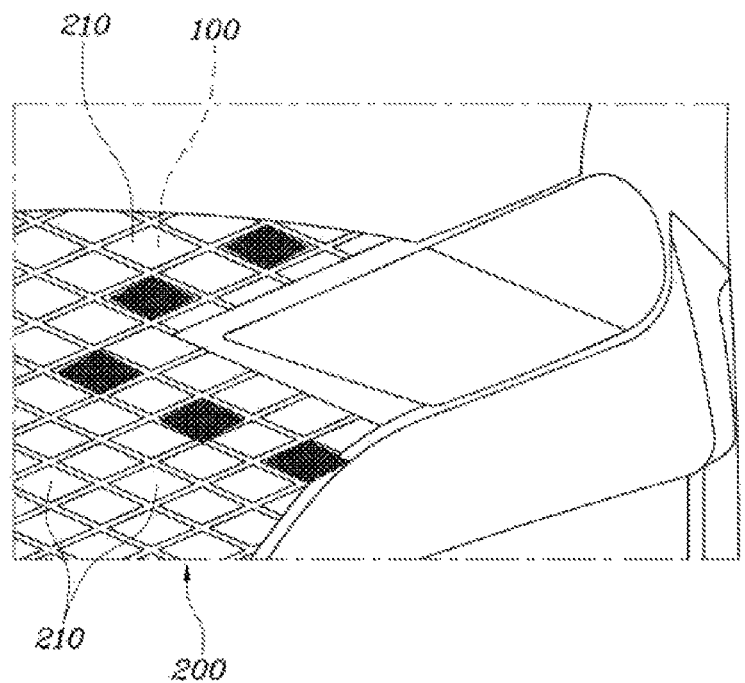
FIGS. 10 and 11 are views showing a message delivery through the hidden light device shown in FIG. 1.
Figure 11:
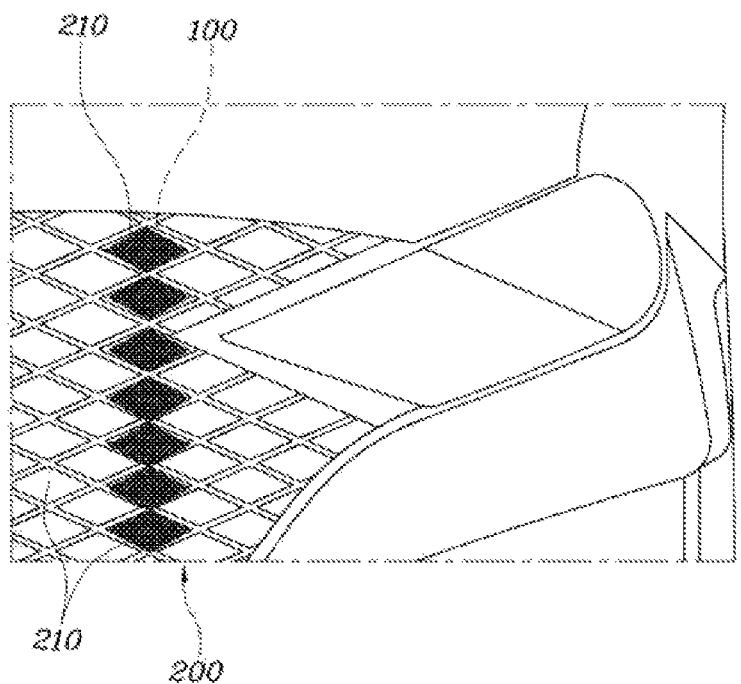

FIG. 1 is a view showing a hidden light device according to the exemplary embodiment of the present disclosure, FIGS. 2 to 6 are views showing the hidden light device shown in FIG. 1, FIGS. 7 to 9 are tables showing the result of a light distribution efficiency experiment when an area of a perforated hole is less than 50% of an entire area of a light emitting area, when an area of the perforated hole is 60% or more of the entire area of the light emitting area, and when the area of the perforated hole is 60% or more in a state positioned at an upper side of the light emitting area, respectively, and FIGS. 10 and 11 are views showing a message delivery through the hidden light device shown in FIG. 1.

Figure 2:
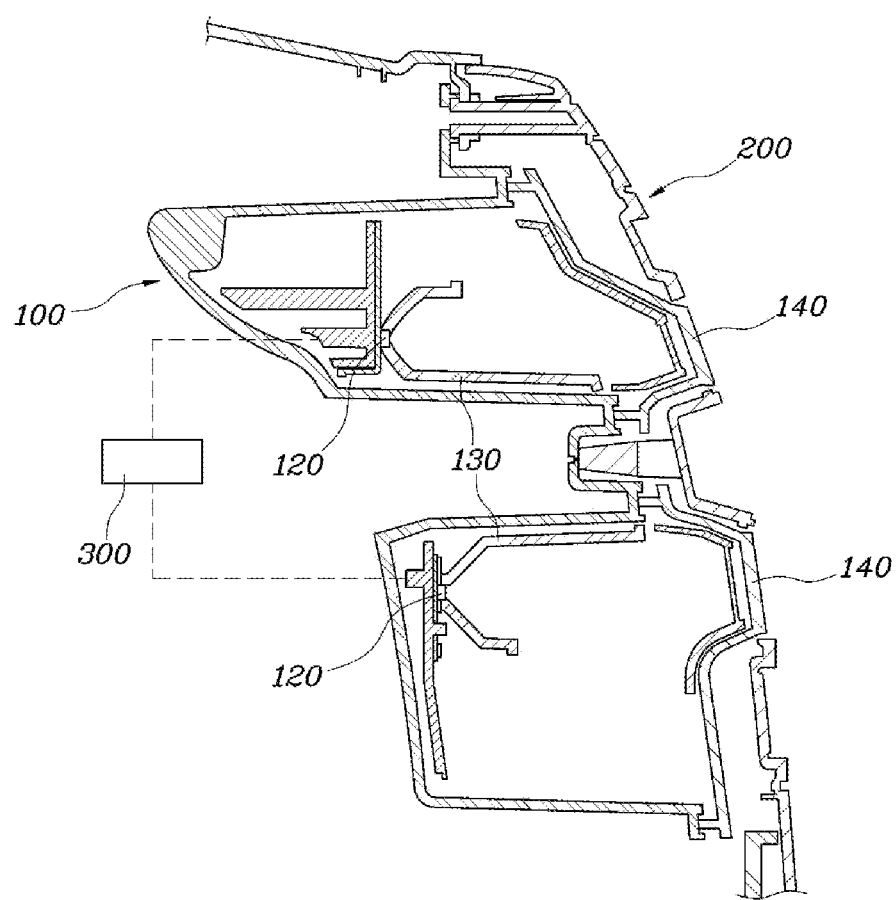
FIGS. 2 to 6 are views showing the hidden light device shown in FIG. 1.

In the hidden light device according to the present disclosure, as shown in FIGS. 1 and 2, an optical module 100 for implementing lighting of a vehicle is provided on a grill 200, thereby emitting light of the optical module 100 through the grill 200. In particular, the grill 200 provided in the vehicle is provided with the optical module 100 for emitting light, and the light emitted from the optical module 100 is illuminated to the outside through the grill 200, so that the grill 200 is configured to emit the light. That is, when the optical module 100 does not emit light, the grill 200 functions to be an exterior design according to a pattern shape, and when the optical module 100 emits the light, the grill 200 serves as lighting of the vehicle when the light is emitted.

In particular, in the present disclosure, a pattern shape of the grill 200 and a shape of a light emitting area 110 to which light is emitted from the optical module 100 are formed to be the same. As shown in FIG. 1, the pattern shape of the grill 200 and the shape of the light emitting area 110 to which the light is emitted from the optical module 100 are formed to be the same, so that the pattern design of the grill 200 is maintained and a sense of heterogeneity due to light emission of the optical module 100 is reduced.

That is, as a pattern of specific shape is prepared for the grill 200, the design of the grill 200 may be determined accordingly. Such a pattern of the grill 200 is an important element expressing the overall design of the grill 200, and in a case where the shape of the light emitting area 110 does not match the pattern shape of the grill 200 when the light is emitted through the optical module 100, the sense of heterogeneity may result, and the design of the grill 200 is deteriorated.

Therefore, the pattern shape of the grill 200 and the shape of the light emitting area 110 of the optical module 100 are formed to be the same, so that light is emitted in the same shape as the pattern shape of the grill 200 even when the light is emitted through the optical module 100, whereby the design of the grill 200 is maintained and aesthetics are improved accordingly.

The grill 200 is provided with a plurality of grid panels 210 having the same pattern shape, and each optical module 100 may be respectively provided for some grid panels 210 or all grid panels 210 among the plurality of grid panels 210. As shown in FIG. 1, the grill 200 is provided with the plurality of grid panels 210, and the grid panel 210 may be made to have all the same shape. The shape of the grid panel 210 may be applied in various forms such as polygons, circles, etc.

The grid panel 210 of the grill 200 is provided with an optical module 100 to enable the grid panel 210 to emit light therefrom when emitting the light from the optical module 100. That is, in the case of the grid panel 210 provided with the optical module 100, the plurality of grid panels 210 forming the grill 200 is configured to enable the optical module 100 to emit the light, and in the case of the grid panel 210 not provided with the optical module 100, the grid panel 210 maintains the design itself. Therefore, in the grill 200, according to the number and positions of the grid panels 210 in which the optical module 100 is provided in the plurality of grid panels 210, the design of the grill 200 depending on the light emission from the optical module 100 may be varied.

That is, when the optical module 100 is provided on all the grid panels 210 of the grill 200, as the light is emitted from the entire area of the grill 200, the amount of light is secured and a function of lighting may be implemented intuitively. Meanwhile, when the optical module 100 is provided on some of the grid panels 210 of the grill 200, the aesthetic impression in the design is improved as the light is emitted in some areas of the grill 200. As the exemplary embodiment, as shown in FIG. 1, a bent shape such as a "<" shape may be implemented for the grid panel, and in this regard, by selectively providing the optical module 100 in the plurality of grid panels 210, various designs may be implemented depending on the emission of the light of the optical module 100.

In the present disclosure, the pattern shape of the grill 200 and the shape of the light emitting area 110 of the optical module 100 may be formed in a rhombus shape. Preferably the pattern shape of the grill 200 and the shape of the light emitting area 110 are matched to the rhombus shape, so that a linear design is implemented, whereby the pattern of the grill 200 may be intuitively recognized when the grill 200 is viewed from the outside. In addition, the pattern image of the grill 200 is implemented linearly, so that the light of the optical module 100 is emitted through the grill 200, whereby when a message is delivered, it is possible to intuitively recognize the corresponding message.

Figure 3:
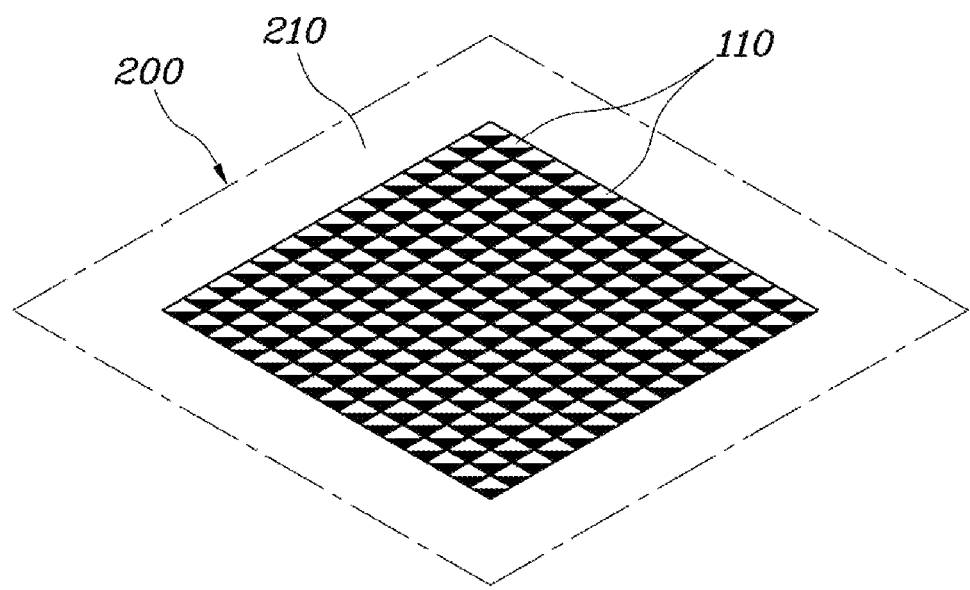

Meanwhile, as shown in FIGS. 1 and 3, the optical module 100 for implementing the lighting of a vehicle is provided on the grill 200, the grid panel 210 is provided with a plurality of light emitting area 110 forming a grid shape, light of the optical module 100 is emitted to the outside through a perforated hole 111 formed in the light emitting area 110, and the entire area of the perforated hole 111 may be configured to exceed at least half or more of the entire area of the light emitting area 110. That is, the grill 200 provided in the vehicle is provided with the optical module 100 for emitting the light, and the light emitted from the optical module 100 is emitted to the outside through the grill 200, so that the grill 200 is configured to emit the light.

Here, the light of the optical module 100 is emitted to the outside through the perforated hole 111 formed in the light emitting area 110. The perforated hole 111 is a part opened to allow the light to be emitted from the inside of the grill 200 to the outside, and the light emitted from the optical module 100 is emitted through the perforated hole 111 to the outside, so that light emission from the grill 200 may be implemented.

That is, the light emitting area 110 of the optical module 100 is an area where the light of the optical module 100 is emitted, and when an area of the perforated hole 111 is increased in the entire area of the emitting area 110, the amount of light transmitted is increased, whereas, when the area of the perforated hole 111 is decreased, the amount of light transmitted is decreased. However, as the area of the perforated hole 111 is increased in the entire area of the light emitting area 110, the inside of the grill 200 is viewed in more detail from the outside, and in the case of making the perforated hole 111 to be excessively large, the design of the grill 200 is deteriorated.

Therefore, the entire area of the perforated hole 111 is configured to exceed at least half or more of the entire area of the light emitting area 110, so that the transmittance of light emitted from the optical module 100 is secured, and the interior of the grill 200 is prevented from being seen from the outside, thereby preventing the design of the grill 200 from being deteriorated.

Here, the perforated hole 111 is preferably set to be 60% or more of the entire area of the light emitting area 110. Even in the case where the perforated hole 111 is 50% or more of the entire area of the light emitting area 110, the light transmittance through the optical module 100 may be secured to some extent, but since the light transmittance may be lowered by other processes including painting, the area of the perforated hole 111 should be set to be 60% or more.

The above mentioned is a result obtained through a light distribution efficiency experiment according to each coordinate, and the light distribution efficiency experiment is conducted to determine a luminous intensity measurement value (light distribution, [cd]) depending on each angle (H: horizontal line, V: vertical line) on a screen. As an example, an indicator of the light distribution efficiency experiment may be conducted to determine the luminous intensity measurement value that satisfies a DRL lamp regulation, and may be capable of determining whether the luminous intensity measurement value according to each coordinate on the screen of 25-meter distance satisfies the DRL lamp regulation. In the results of light distribution efficiency experiment of FIGS. 7 to 9, HV point is an optical center point, and light distribution is satisfied only when the light distribution is satisfied with a value of 400 cd to 1200 cd. In addition, U is Up, D is down, L is Left, and R is Right, and a degree of light distribution satisfaction may be checked for each coordinate. For example, "10U-5L" is a position coordinate spaced upward by 10 degrees and leftward by 5 degrees from a reference point By checking whether the luminous intensity measurement value of the corresponding position satisfies the minimum target value of 80 cd and the maximum target value of 1200 cd, it is possible to determine whether the light distribution efficiency is satisfied.

As a result of such a light distribution efficiency experiment, when an area of the perforated hole 111 is less than 50% of the entire area of the light emitting area 110, as shown in FIG. 7, it may be seen that some points among the multiple points for the light emitting area are not satisfied. In addition, it may be seen that even at the remaining points, the luminous intensity measurement value is only secured to a level that is barely satisfactory.

However, as shown in FIG. 8, when an area of the perforated hole 111 is 60% or more of the entire area of the light emitting area 110, it may be seen that the luminous intensity measurement value is satisfied for all points.

In addition, when the area of the perforated hole 111 is 60% or more in a state positioned at an upper side of the light emitting area 110, as shown in FIG. 9, it may be seen that the luminous intensity measurement value is satisfied for all points and a higher luminous intensity is secured.

As described above, the area of the perforated hole 111 is preferably set to 60% or more of the entire area of the light emitting area 110, and sufficient luminous intensity may be secured when positioned on the upper side of the light emitting area.

Here, the pattern shape of the grill 200 and the shape of the light emitting area 110 are famed to be the same rhombus shape, so that a linear design of the grill 200 is implemented, whereby the pattern of the grill 200 is intuitively recognized when the grill 200 is viewed from the outside. In addition, since the pattern image of the grill 200 is linearly implemented, when a message is delivered by way of emitting light of the optical module 100 through the grill 200, it is possible to intuitively recognize the corresponding message from the outside.

Figure 4:
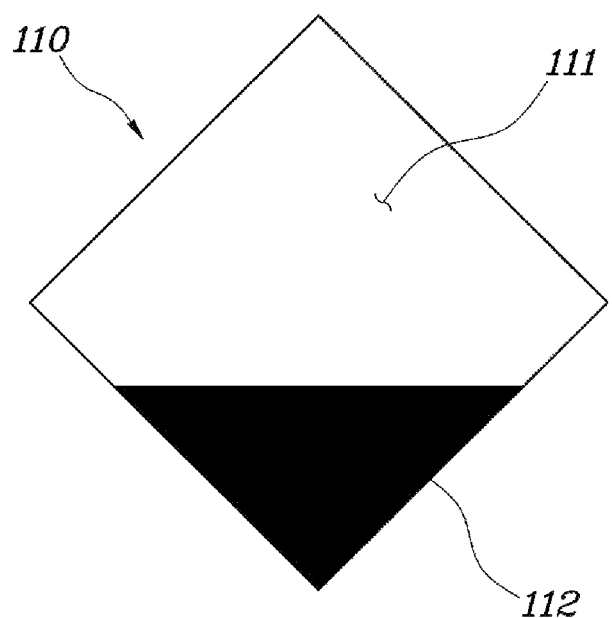

Meanwhile, as shown in FIG. 4, the optical module 100 for implementing the lighting of the vehicle is provided in the grill 200, light of the optical module 100 is emitted to the outside through the perforated hole 111 provided in the light emitting area 110, the perforated hole 111 is positioned on the upper side of the light emitting area 110, and the non-perforated part 112 through which the light is not transmitted may be provided. That is, the grill 200 provided in a vehicle is provided with the optical module 100 for emitting the light, and the light emitted from the optical module 100 is emitted to the outside through the grill 200, whereby the grill 200 is made to emit the light.

That is, as the light emitting area 110 is divided into the perforated hole 111 and the non-perforated part 112, the light emitted from the optical module 100 is emitted to the outside through the perforated hole 111, and the light is not projected to the outside in the non-perforated part 112.

In particular, as the perforated hole 111 is positioned at the upper side of the light emitting area 110 and the non-perforated part 112 is positioned at the lower side of the perforated hole 111, a pentagonal jewel-like shape may be realized when the grill 200 is viewed from the outside. In particular, the perforated hole 111 is a part through which the light of the optical module 100 is transmitted. When the grill 200 is viewed from the outside, the inside thereof is partially visible through the perforated hole 111. In general, as the grill 200 of the vehicle is disposed on the lower side of the vehicle, when the grill 200 is viewed from the outside, the grill 200 is viewed as looking down from the upper side to the lower side. In the light emitting area 110, as the perforated hole 111 is provided on the upper side and the non-perforated part 112 is provided on the lower side, when looking at the grill from the outside, the non-perforated part 112 is visible through the perforated hole 111. When the grill 200 is viewed from the outside, the non-perforated part 112 is viewed, and the jewel-like shape is realized by visibility of the remaining coating of the non-perforated part 112, so that the exterior design of the grill 200 may be further advanced. In addition, since the perforated hole 111 is disposed at the upper side of the light emitting area 110, the visibility of light is improved as the light of the optical module 100 passes through the perforated hole 111 and is emitted upward.

Meanwhile, the area of the perforated hole 111 occupies 60% of the entire area of the light emitting area 110, and the non-perforated part 112 may be provided in the remaining area except for the area of the perforated hole 111. Because the area of the perforated hole 111 is set to be 60% or more of the entire area of the light emitting area 110, light transmittance may be secured even when the light transmittance decreases due to other processes including painting. In addition, as the non-perforated part 112 is provided in the remaining area except for the area of the perforated hole 111, it is easy to realize the jewel-like shape through the non-perforated part 112 when the grill 200 is viewed from the outside.

Meanwhile, as the pattern shape of the grill 200 and the shape of the light emitting area 110 of the optical module 100 are formed to be the same in a rhombus shape and the perforated hole 111 is configured to exceed at least half or more of the entire area of the light emitting area 110, the perforated hole 111 is formed in a pentagonal shape, and accordingly, the non-perforated part 112 may be formed in a triangular shape in the remaining area of the light emitting area 110.

As described above, the pattern shape of the grill 200 and the shape of the light emitting area 110 of the optical module 100 is made to be the same in a rhombus shape, so that a linear design of the grill 200 is implemented, whereby the pattern of the grill 200 is intuitively recognized when the grill 200 is viewed from the outside. In addition, since the pattern image of the grill 200 is linearly implemented, when a message is delivered by way of emitting light of the optical module 100 through the grill 200, it is possible to intuitively recognize the corresponding message from the outside.

In addition, the perforated hole 111 is configured to exceed at least half or more of the entire area of the light emitting area 110, whereby the perforated hole 111 is formed in a pentagonal shape, and accordingly, the non-perforated part 112 may be formed in a triangular shape in the remaining area of the light emitting area 110. That is, the shape of the light emitting area 110 of the optical module 100 is formed in a rhombus shape, and as the area of the perforated hole 111 of the light emitting area 110 exceeds at least half or more of the entire area, the perforated hole 111 is formed in a pentagonal shape. Because the shape of the perforated hole 111 is formed in a pentagonal shape, in a state where the light is not emitted by the triangular shaped non-perforated part 112 disposed at the lower side of the perforated hole 111, the light transmittance may be sufficiently secured in the rhombus-shaped light emitting area 110, and it is easy to realize the jewel-like shape that minimizes heterogeneity and advances the design.

Meanwhile, the optical module 100 for implementing the lighting of a vehicle is provided on the grill 200, and the optical module 100 may be configured to include: a light source 120 for emitting light; a reflector 130 for reflecting the light from the light source; and a lens 140 providing a light emitting area 110 in which the light reflected through the reflector 130 is emitted to the outside and formed in the same shape as the pattern shape of the grill 200.

The light source 120 may be composed of a light emitting diode (LED), and the reflector 130 preferably is composed of a mirror that is bent to change the direction of light emitted from the light source so as to be emitted to the outside. The lens 140 is disposed in front of the reflector 130 to allow the light to be emitted to the outside, and is provided in the same shape as the pattern shape of the grill 200, thereby maintaining the pattern design of the grill 200 and reducing heterogeneity due to the light emission of the optical module 100.

In the lens 140, a plurality of optical parts 144 are configured to protrude outward, and each optical part 144 may be configured to have a respective light emitting area. For example, because the optical part 144 protrudes from the lens 140, it is possible to implement an advanced image by the reflected light when the grill 200 is viewed from the outside. In particular, it is preferable that each optical part 144 is disposed to respectively correspond to each light emitting area 110.

Figure 5:
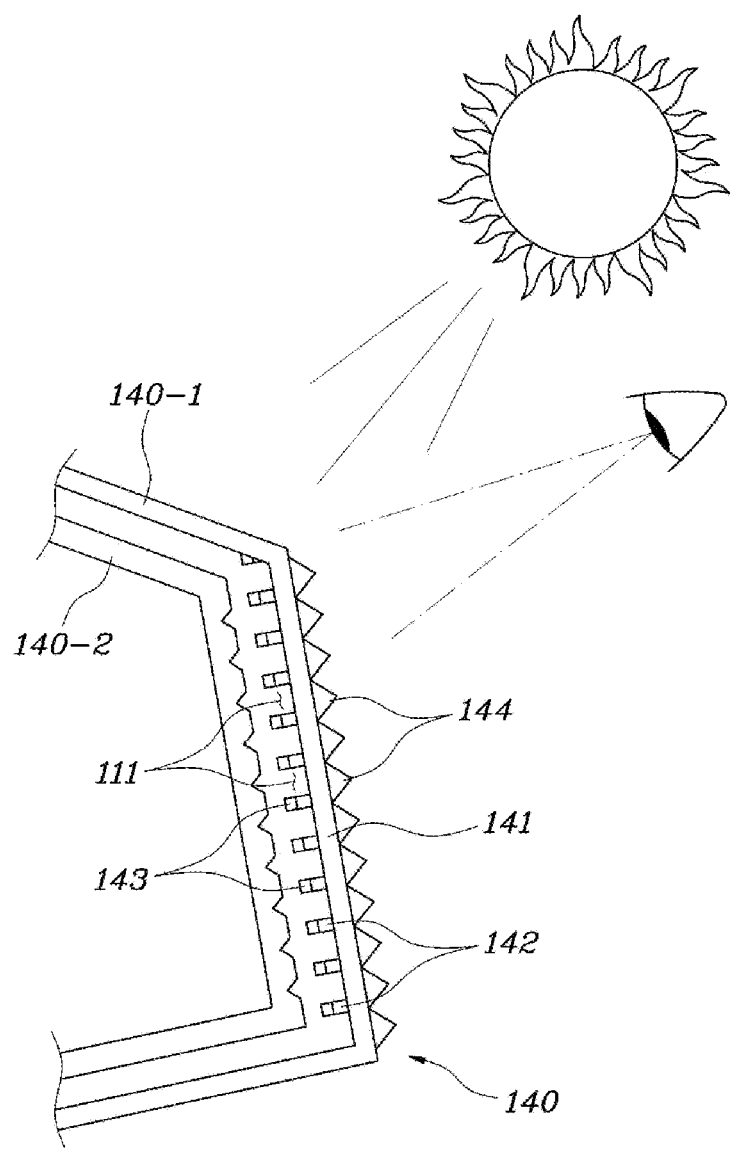
Figure 6:
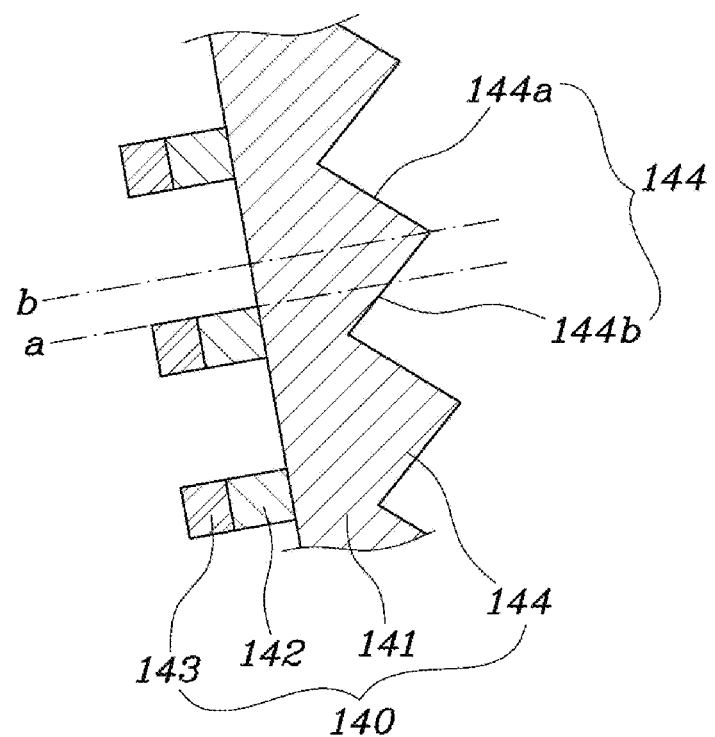

In particular, as shown in FIGS. 5 and 6, the optical part 144 is composed of an upper side surface 144a and a lower side surface 144b, which are extended to protrude at an angle from positions spaced apart from each other and meet at a pointed end together, and the light emitting area 110 may be composed of the perforated hole 111 through which light is transmitted to the upper side and the non-perforated part 112 through which light is not transmitted to the lower side.

The optical part 144 is provided with the upper side surface 144a and the lower side surface 144b, which are connected with an inclination, so that sunlight is reflected on the upper side surface 144a and the sunlight is not reflected to the lower side surface 144b when the grill 200 is viewed from the outside, whereby an image difference between the upper side surface 144a and the lower side surface 144b of the optical part 144 is generated. In addition, on the upper side, the light emitting area 110 is provided with the perforated hole 111 through which light is transmitted, and on the lower side, the light emitting area 110 is provided with the non-perforated part 112 through which light is not transmitted, whereby when the grill 200 is viewed from the outside, as the non-perforated part 112 is visible, the jewel-like shape is realized.

The optical part 144 is provided so that the upper side surface 144a and the lower side surface 144b are extended at the same angle to meet at a pointed end together, and the light emitting area 110 may be provided so that the point a at which the perforated hole 111 and the non-perforated part 112 are branched is disposed at a position below the point bat which the upper side surface 144a and the lower side surface 144b are connected to each other. Accordingly, the perforated hole 111 may be configured to exceed at least half or more of the entire area of the light emitting area 110.

That is, as the upper side surface 144a and the lower side surface 144b are extended at the same angle, the optical part 144 forms a shape of an isosceles triangle, and the light emitting area 110 is provided so that the point a at which the perforated hole 111 and the non-perforated part 112 are branched is disposed at the point below the point b at which the upper side surface 144a and the lower side surface 144b are connected to each other, whereby the visibility of the non-perforated part 112 is secured through the perforated hole 111 when the grill 200 is viewed from the outside.

In particular, as the grill 200 of the vehicle is disposed on the lower side of the vehicle in general, when viewed from the outside, the grill 200 is viewed looking down from the top to the bottom. When the grill 200 of the vehicle is viewed from the outside, sunlight is reflected on the upper side surface 144a of the optical part 144 provided on the lens 140 and sunlight is not reflected on the lower side surface 144b. Accordingly, the design is implemented depending on the difference in the reflected image between the upper side surface 144a and the lower side surface 144b, and when the inside of the grill 200 is viewed through the upper side surface 144a of the optical part 144, the non-perforated part 112 is viewed through the perforated hole 111, whereby the jewel-like shape is realized due to the visibility of the remaining coating of the non-perforated part 112. Due to this arrangement, the exterior design of the grill 200 is advanced. In addition, as the light emitting area 110 is provided so that the point a at which the perforated hole 111 and the non-perforated part 112 are branched is disposed at the position below the point b at which the upper side surface 144a and the lower side surface 144b are connected to each other, the area of the perforated hole 111 is increased, thereby securing the light transmittance of the optical module 100 during the lighting function.

Meanwhile, the shape of the optical parts 144 may have the same shape as the pattern shape of the grill. The shape of the optical part 144 is formed to be the same as the pattern shape of the grill 200, whereby the pattern design of the grill 200 is maintained and the sense of heterogeneity due to the light emission of the optical module 100 is reduced. Because the pattern shape of the grill 200 and the shape of the optical part 144 are formed to be the same, the design according to a layout may be maintained, so that light is emitted in the same shape as the pattern shape of the grill 200 even when the light is emitted through the optical module 100, whereby the design of the grill 200 is maintained and aesthetics are improved.

In particular, the pattern shape of the grill 200, the shape of the lens 140, the shape of the light emitting area 110, and the shape of the optical part 140 may be formed in the same shape as a rhombus. The shape of the optical part 140, the pattern shape of the grill 200, the shape of the light emitting area 110, and the shape of the lens 140 are all matched with the rhombus shape, so that the linear design is realized, whereby it is possible to intuitively recognize the pattern of the grill 200 when the grill 200 is viewed from the outside. In addition, as the shape of the optical part 140 is matched in the shape of the rhombus, when the grill 200 is viewed, the design according to the shape of the rhombus may be clearly expressed. The pattern image of the grill 200 is implemented linearly, whereby when a message is delivered by way of emitting the light of the optical module 100 through the grill 200, the corresponding message may be intuitively recognized.

The lens 140 preferably includes: a transparent layer 141 disposed on an outer side thereof and configured to transmit light; a reflective layer 142 coupled to an inner side of the transparent layer 141 and configured to reflect light; and a coating layer 143 coupled to the inner side of the reflective layer 142 and having a low light transmittance compared to that of the transparent layer 141, wherein in the reflective layer 142 and the coating layer 143, at the same position, the plurality of perforated holes 111 opened to the transparent layer 141 may be spaced out, thereby providing a plurality of light emitting areas 110.

The lens 140 is composed of the transparent layer 141, the reflective layer 142, and the coating layer 143. In particular, the transparent layer 141 is made of a transparent plastic material, and the reflective layer 142 is made of a material capable of reflecting light and is coated on the transparent layer 141, and on the reflective layer 142, the coating layer 143 is coated with a material having low light transmittance. Further, the reflective layer 142 and the coating layer 143 are made of the same material as the grill 200, and may form the aesthetics of the grill 200. That is, when the grill 200 is viewed from the outside, the jewel-like shape is realized as the reflective layer 142 is viewed through the transparent layer 141, and the inside of the grill is not visible by the reflective layer 142 and the coating layer 143.

In particular, in the reflective layer 142 and the coating layer 143, at the same position, the plurality of perforated holes 111 opened to the transparent layer 141 is spaced out, whereby a plurality of light emitting area 110 may be provided. That is, the light emitted from the optical module 100 may pass through the transparent layer 141 through the plurality of perforation holes 111 formed in the reflective layer 142 and the coating layer 143, so as to be emitted to the outside. The perforated hole 111 is the part opened to allow the light emitted from the optical module 100 to be emitted to the outside. As the perforated hole is provided at the same position of the reflective layer 142 and the coating layer 143 and is opened up to the transparent layer 141, the light may pass through the reflective layer 142 and the coating layer 143 to be emitted to the outside.

The lens 140 of the present disclosure provides the aesthetics of the grill 200 through the transparent layer 141, the reflective layer 142, and the coating layer 143, but the perforated hole 111 is provided in the reflective layer 142 and the coating layer 143, so that the light emitted from the optical module 100 is emitted to the outside through the perforated hole 111, thereby implementing the lighting function.

In addition, the lens 140 may include: an outer lens 140-1 composed of the transparent layer 141, the reflective layer 142, and the coating layer 143; and an inner lens 140-2 disposed inside the outer lens 140-1 and having a plurality of protrusions or grooves to scatter light emitted from the optical module 100.

The lens 140 is composed of the outer lens 140-1 and the inner lens 140-2, and the outer lens 140-1 provides the aesthetics of the grill 200, and the inner lens 140-2 is configured to scatter the light emitted from the optical module 100. Here, the inner lens 140-2 is disposed inside the outer lens 140-1 and provided with the plurality of protrusions or grooves, so that the light emitted from the optical module 100 is scattered by the plurality of protrusions or grooves, whereby a hotspot is removed and the visibility of light is improved.

FIGS. 10 and 11 are views showing a message delivery through the hidden light device shown in FIG. 1. The optical module 100 that implements the lighting of a vehicle is provided on the grill 200, so that the light of the optical module 100 is emitted through the grill 200. The plurality of optical modules 100 is provided in the grill 200 and may be configured to be individually turned on and off. Through the individual light on-off control of the optical module 100, various lighting functions may be implemented by diversifying the position at which the light is emitted from the grill 200 and by diversifying the intensity of the light.

A controller 300 for individually controlling the optical module 100 to be turned on and off may be further included, and the controller 300 is configured to control sequential lighting that sequentially turns on and off the plurality of optical modules 100 and capable of controlling the image realization for communication by turning on and off only some of the optical modules. Here, the controller 300 is configured to control the turning on and off of the optical module 100 by receiving a user's manipulation or various sensor signals, and the plurality of optical modules 100 in the grill 200 is sequentially controlled for the turning on and off from one side to the other or from the other side to one side, whereby the lighting design may be advanced, and the directionality depending on a situation may be delivered to the other vehicles or pedestrians. In addition, the controller 300 implements a message such as a text or a figure by turning on and off only some of the optical modules 100, so that the communication may be performed through the delivery of various messages.

The hidden light device having the structure as described above is arranged so that light is emitted from the grill 200 of the vehicle, and when the light is not emitted, the light emitting area 110 implements the aesthetics of the grill 200, thereby maintaining the design of the grill 200. As described above, the present disclosure has been described with reference to the particular exemplary embodiments. However, those skilled in the art will appreciate that various modifications, additions and substitutions are possible, without departing from the scope and spirit of the disclosure as disclosed in the accompanying claims.

What is claimed is:

1. A hidden light device for a vehicle, comprising:
    a grill having an outer surface forming a pattern composed of a plurality of grids;
    grid panels provided to some or all of the plurality of grids, respectively, each of the grid panels being coupled to an associated grid in a same shape as that of the associated grid to form a surface of the associated grid;
    an optical module provided inside each of the grid panels to allow the grid panels to form the pattern of the grill when turned off, and to emit light through the grid panel when turned on so as to serve as lighting of the vehicle; and
    a controller configured to control the optical modules to be turned on and off independently, so as to allow an image of the lighting for a message delivery to be implemented through the grill as the light is emitted from some grid panels through selective operation of turning on and off of the optical modules,
    wherein the optical module comprises:
        a light source for emitting the light;
        a reflector for reflecting the light from the light source; and
        a lens providing a light emitting area in which the light reflected through the reflector is emitted to outside and formed to be identical to a pattern shape of the grill.

2. The hidden light device of claim 1, wherein the controller is configured to control sequential lighting that sequentially turns on and off the plurality of optical modules, or is configured to control an implementation of the image that communicates by turning on and off only some of the optical modules.

3. The hidden light device of claim 1, wherein:
    the grill is composed of the grid panels having a same pattern shape, and
    the optical modules are respectively provided inside some of the plurality of grid panels or all of the plurality of grid panels.

4. The hidden light device of claim 1, wherein each of the grid panels is composed of a plurality of light emitting areas formed in a grid-shape.

5. The hidden light device of claim 1, wherein the grill and the light emitting areas corresponding to the optical module are in a rhombus shape.

6. The hidden light device of claim 1, wherein the light of the optical module is emitted to outside through a perforated hole provided in the light emitting area.

7. The hidden light device of claim 6, wherein an entire area of the perforated hole is configured to exceed at least half or more of an entire area of the light emitting area.

8. The hidden light device of claim 6, wherein the perforated hole is positioned on an upper side of the light emitting area, and a non-perforated part through which no light is transmitted is provided on a lower side of the light emitting area.

* * * * *